Patented May 26, 1936

2,042,285

UNITED STATES PATENT OFFICE 2,042,285

PRODUCTION OF CARBON MONOXIDE AND HYDROGEN FROM METHANE

Ernst Wilke, Heidelberg, and Fritz Fried, Mannheim, Germany, assignors to I. G. Farbenindustrie Aktiengesellschaft, Frankfort-on-the-Main, Germany No Drawing. Application August 21, 1930, Serial No. 476,945. In Germany September 11, 1929

7 Claims. (Cl. 23—212)

The present invention relates to the production of carbon monoxide and hydrogen from methane.

We have found that mixtures of carbon monoxide and hydrogen may be obtained in a simple and advantageous manner from methane or gases containing the same, such as natural gas, illuminating gas, coke oven gas and the like, by subjecting these gases at elevated temperatures to the action of those higher oxides of heavy metals capable of forming several oxides which are not reduced by hydrogen under the conditions of working. By this treatment the methane is split with the formation of hydrogen and carbon monoxide, the metallic oxide being reduced to a lower oxide of said metal. The resulting lower oxide may then be reconverted into the higher oxide with the aid of substances supplying oxygen, especially gases or vapors such as air, steam or carbon dioxide, whereby nitrogen or hydrogen or carbon monoxide, respectively, are obtained simultaneously. The temperature necessary for the regeneration of the higher oxide depends on the oxidizing medium employed. With air for example the oxidation may be effected at temperatures above 400° C.; in the case of steam it is necessary to use higher temperatures for example a temperature of 800° C. By suitably selecting the temperature and the velocity of flow of the oxidizing gases in this oxidation stage, it is possible to obtain the resulting gases in a state practically free from the oxidizing medium. When employing steam as oxidizing agent practically pure hydrogen may be obtained in any case, since any steam not reacting with the lower oxide may be separated by condensation from the gas leaving the oxidic mass.

Especially suitable in the process according to the present invention are the oxides of titanium and chromium. Also the oxides of tungsten and molybdenum may be employed with advantage. In order to avoid a gradual disintegration of the oxides to powder it is advantageous to mix them with solid substances stable under the working conditions, such as magnesium oxide or aluminium oxide. The masses thus prepared remain unaltered even after a long use.

The process according to the present invention may be carried out at temperatures between about 600° and 1100° C., preferably between 800° and 1000° C. The reaction may be carried out at any desired pressure, whether atmospheric or elevated or reduced pressure. Generally it is most advantageous to work at atmospheric pressure.

The following examples will further illustrate the nature of this invention, the invention is, however, not restricted thereto.

Example 1

Methane is passed at 800° C. over granular titanium dioxide with a velocity of flow of 20 litres per hour to each 100 cubic centimetres of titanium dioxide. A gas mixture substantially consisting of hydrogen and carbon monoxide in the ratio of 2:1 and only from 3 to 5 per cent of methane is obtained. Air is then passed at 800° C. over the resulting titanium oxide with a velocity of flow of 20 litres per hour to each 100 cubic centimetres of titanium oxide, thus reconverting the titanium oxide into titanium dioxide, which latter may be used for the treatment of further amounts of methane. The gas obtained in the regeneration of titanium dioxide substantially consists of nitrogen and contains not more than about 2 per cent of oxygen.

Example 2

A gas mixture containing about 66 per cent of methane is passed at 750° C. over lumps prepared by making equal parts, by weight, of chromic oxide and magnesium oxide into a paste with water, drying and comminuting the cake thus formed. The velocity of flow of the said gas mixture is so chosen that 10 litres thereof per hour pass over each 100 cubic centimetres of the oxidic mass. The methane is thereby decomposed practically completely into hydrogen and carbon monoxide. Steam is then passed at 800° C. over the resulting oxidic mass, whereby practically pure hydrogen is formed, and the mass is reconverted into a state in which it may be used for the conversion of further amounts of methane.

What we claim is:—

1. A process for the production of hydrogen and carbon monoxide from an essentially normally gaseous substance comprising methane which comprises passing said gaseous substance at a temperature ranging from 600° to 1100° C. in the absence of substantial quantities of added oxidizing gas over a substance comprising such higher oxide of a metal selected from the group consisting of chromium, titanium, tungsten and molybdenum, as is stable to steam at 800° C., said higher oxide thereby being reduced by the action of methane to a lower oxide of said metal.

2. A process for the production of hydrogen and carbon monoxide from an essentially normally gaseous substance comprising methane which comprises passing said gaseous substance at a temperature ranging from 800° to 1100° C. in the absence of substantial quantities of added oxidizing gas over a substance comprising such higher oxide of a metal selected from the group consisting of chromium, titanium, tungsten and molybdenum, as is stable to steam at 800° C. and a solid substance stable under the conditions of working, said higher oxide thereby being reduced by the action of methane to a lower oxide of said metal.

3. A process for the production of hydrogen and carbon monoxide from an essentially normally gaseous substance comprising methane which comprises passing said gaseous substance at a temperature ranging from 600° to 1100° C. in the absence of substantial quantities of added oxidizing gas over a substance comprising such higher oxide of a metal selected from the group consisting of chromium, titanium, tungsten and molybdenum, as is stable to steam at 800° C., together with an oxide selected from the group consisting of magnesium oxide and aluminium oxide, said higher oxide thereby being reduced by the action of methane to a lower oxide of said metal.

4. A process for the production of hydrogen and carbon monoxide from an essentially normally gaseous substance comprising methane which comprises passing said gaseous substance at a temperature ranging from 600° to 1100° C. in the absence of substantial quantities of added oxidizing gas over a substance comprising such higher oxide of a metal selected from the group consisting of chromium, titanium, tungsten and molybdenum, as is stable to steam at 800° C., said higher oxide thereby being reduced by the action of methane to a lower oxide of said metal, and then converting the resulting lower oxide into a higher oxide by treatment with an oxidizing substance and repeating the steps of the methane conversion process by passing additional methane over said reoxidized substance at a temperature of 600° to 1100° C.

5. A process for the production of hydrogen and carbon monoxide from an essentially normally gaseous substance comprising methane which comprises passing said gaseous substance at a temperature ranging from 600° to 1100° C. in the absence of substantial quantities of added oxidizing gas over a substance comprising such higher oxide of a metal selected from the group consisting of chromium, titanium, tungsten and molybdenum, as is stable to steam at 800° C., and in the absence of steam, said higher oxide thereby being reduced by the action of methane to a lower oxide of said metal, and then converting the resulting lower oxide into a higher oxide by treatment with air and repeating the steps of the methane conversion process by passing additional methane over said reoxidized substance at a temperature of 600° to 1100° C.

6. A process for the production of hydrogen and carbon monoxide from an essentially normally gaseous substance comprising methane which comprises passing said gaseous substance at a temperature ranging from 600° to 1100° C. in the absence of substantial quantities of added oxidizing gas over a substance comprising such higher oxide of a metal selected from the group consisting of chromium, titanium, tungsten and molybdenum, as is stable to steam at 800° C., and in the absence of steam, said higher oxide thereby being reduced by the action of methane to a lower oxide of said metal, and then converting the resulting lower oxide into a higher oxide by treatment with steam and repeating the steps of the methane conversion process by passing additional methane over said reoxidized substance at a temperature of 600° to 1100° C.

7. A process for the production of hydrogen and carbon monoxide from an essentially normally gaseous substance comprising methane which comprises passing said gaseous substance at a temperature ranging from 600° to 1100° C. in the absence of substantial quantities of added oxidizing gas over a substance comprising such higher oxide of a metal selected from the group consisting of chromium and titanium as is stable to steam at 800° C., said higher oxide thereby being reduced by the action of methane to a lower oxide of said metal.

ERNST WILKE.
FRITZ FRIED.